United States Patent

[11] 3,573,580

[72] Inventor  Nozomu Shinozaki
              Neyagawa-shi, Japan
[21] Appl. No. 817,896
[22] Filed     Apr. 21, 1969
[45] Patented  Apr. 6, 1971
[73] Assignee  Matsushita Electric Industrial Co., Ltd.
              Osaka, Japan
[32] Priority  Apr. 26, 1968
[33]           Japan
[31]           43/35281

[54] SOFT STARTING DEVICE FOR MOTORS
     4 Claims, 5 Drawing Figs.
[52] U.S. Cl. .................................................. 318/227,
                                              318/230, 318/416
[51] Int. Cl. ................................................... H02p 5/40
[50] Field of Search ........................................... 318/227,
                                                       230, 416

[56]              References Cited
              UNITED STATES PATENTS
     3,045,163   7/1962   Collom ........................ 318/227
     3,108,215  10/1963   Pettit et al. ................... 318/227
     3,189,810   6/1965   MacGregor .................. 318/227

Primary Examiner—Oris L. Rader
Assistant Examiner—Gene Z. Rubinson
Attorney—Stevens, Davis, Miller and Mosher ABSTRACT: A soft starting device so designed that when a three-phase induction motor is to be started by applying a full line voltage of a power source thereto, the device starts the motor with an extremely low starting torque and thereafter gradually increases the motor speed to cause it to proceed into a steady state rotation.

Patented April 6, 1971

INVENTOR

NOZOMU SHINOZAKI

BY Stevens, Davis, Miller & Mosher

ATTORNEYS

Patented April 6, 1971 3,573,580

INVENTOR
NOZOMU SHINOZAKI

BY Stevens, Davis, Miller & Mosher

ATTORNEYS

SOFT STARTING DEVICE FOR MOTORS

The present invention relates to a soft starting device for motors. For example, when a full line voltage is supplied to start a three-phase induction motor used for driving a hoist, the motor starts suddenly, and due to the force of shocks developed caused by starting of the motor, a load suspended by the hoist is caused to swing resulting in a very dangerous condition.

In this case, a soft starting device is needed which is designed to start the motor with a starting torque which is much lower than the one produced when a full line voltage is applied to the primary winding of the motor.

To provide such starting devices, hitherto proposed means utilize various soft start couplings which are provided between a motor and a load. Included among the soft starting couplings of the kind hitherto proposed are permanent magnet couplings, eddy current couplings, fluid couplings, steel ball couplings and, etc.

Other attempts have also been made, in which, in order to provide a soft start to a motor through the control of voltages supplied to the motor, a resistor or reactor is inserted in one, two or three phases of a three-phase induction motor so that the resistors or reactors are short-circuited after current is permitted to flow therethrough during the starting of the motor, or in which the connection of the winding of the motor is changed from star to delta.

Still further attempts have been made in which are used motors specially designed for soft starting including part-winding motors, wound-rotor motors with slip rings, etc.

However, the disadvantages of the above described prior art devices lie in the facts that their constructions are complicated and their cost is high, that, when contactor contacts are utilized for changing the motor circuit, the torque changes in steps so that no smooth starting of the motor is ensured, and that, if soft start couplings are employed, not only do the devices tend to become larger and skill in operating the devices as well as their regular adjustments are needed, but also the wear and tear of the moving parts are considerable.

The present invention provides improvements in regard to the previous drawbacks described above.

The present invention relates to a device wherein silicon controlled rectifiers are connected in series in one phase of the power supply circuit of a three-phase induction motor and the motor is started slowly by gradually increasing the conduction angle of these silicon controlled rectifiers. The present invention also aims to construct an inexpensive soft starting device in which the conduction angles of said silicon controlled rectifiers are controlled by means of static devices.

Accordingly, a motor equipped with a soft starting device according to the present invention is highly safe and useful when it is used in applications such as for driving a hoist.

The present invention will be described hereinafter in conjunction with the accompanying drawings in which.

Now, a detailed description of the embodiment of the present invention will be made hereinafter.

Figure 1:
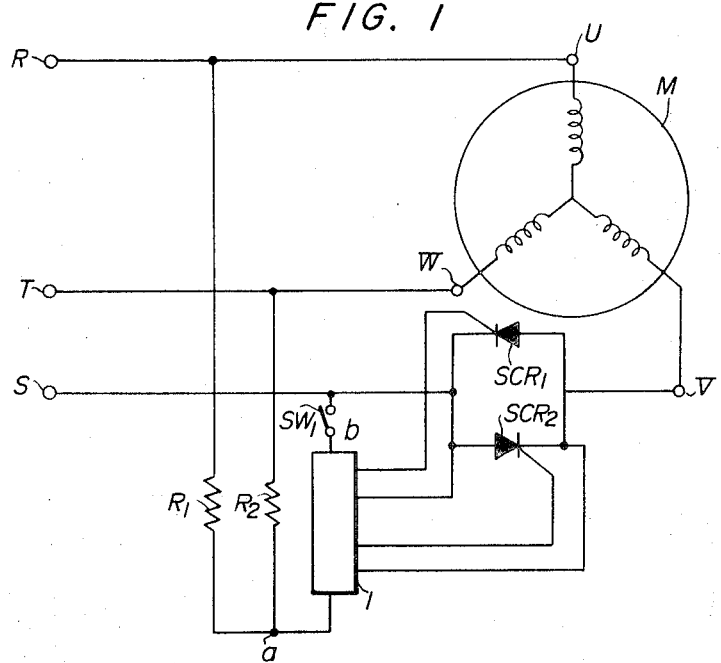
FIG. 1 is a schematic circuit diagram of a soft starting device for motors showing an embodiment of the present invention.

Referring to FIG. 1, M designates a three-phase induction motor for driving a hoist; $SCR_1$ and $SCR_2$, silicon controlled rectifiers connected in antiparallel with each other and connected in series in one phase of the three-phase induction motor. Reference characters U, V and W designate motor terminals, respectively; R, S and T, terminals of a three-phase power source.

Numeral 1 designates a firing phase control circuit of the silicon controlled rectifiers $SCR_1$ and $SCR_2$, with one power supply side terminal $a$ of the phase control circuit 1 being connected to a junction point of resistors $R_1$ and $R_2$ which are connected at one end each thereof with power supply terminals R and T and the other power supply side terminal $b$ of the phase control circuit 1 being connected through a switch $SW_1$ to a power source terminal S to which are connected $SCR_1$ and $SCR_2$. The impedance of the circuit 1 and the impedances of the resistors $R_1$ and $R_2$ are balanced with respect to the three-phase source.

In other words, the phase control circuit 1 is replaceable with an equivalent resistor. Thus, if the resistance value of this equivalent resistor and the resistance values of said resistors $R_1$ and $R_2$ are all selected to be the same, their neutral point $a$ will have the same potential as the neutral point of the motor M so that the voltage applied to the phase control circuit 1 will be in same phase with the voltage applied to the silicon controlled rectifiers $SCR_1$ and $SCR_2$. Thus, smooth phase control may be effected in $SCR_1$ and $SCR_2$.

Figure 4:
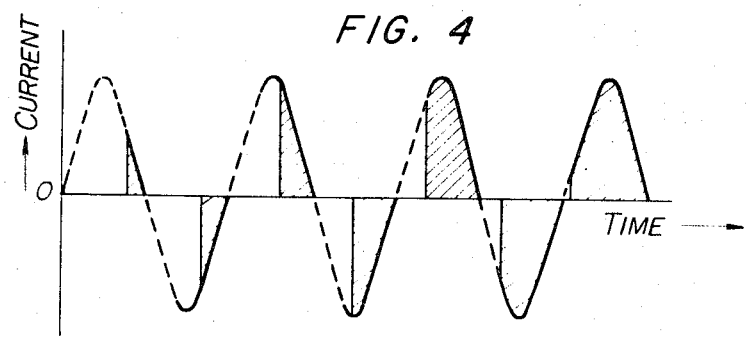
FIG. 4 is a characteristic curve of the current flowing through the motor.
Figure 2:
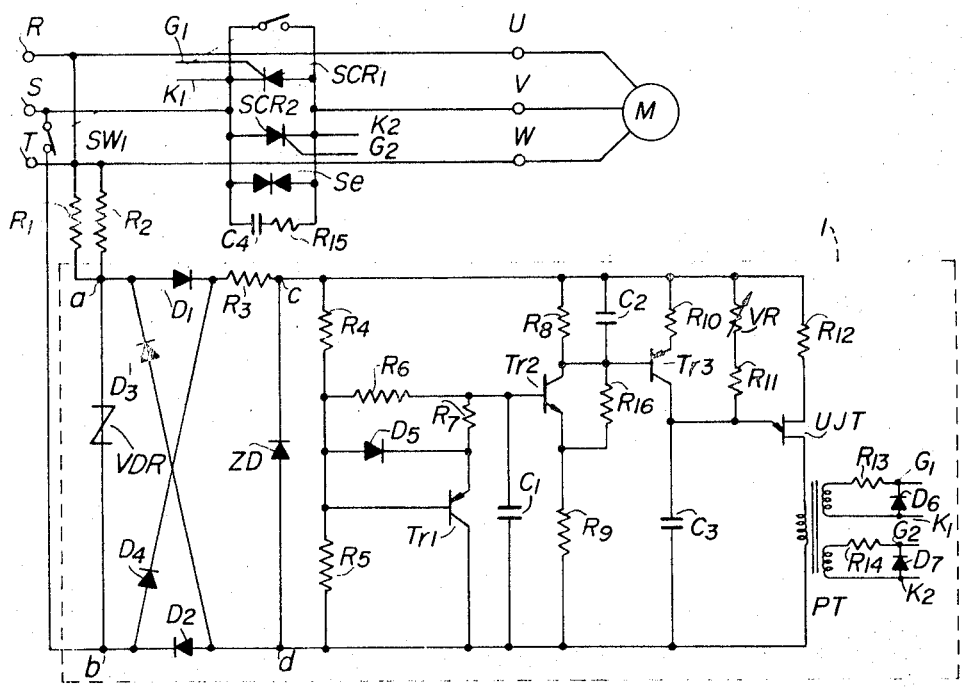
FIG. 2 is a detailed circuit diagram of the soft motor starter of FIG. 1.
Figure 5:
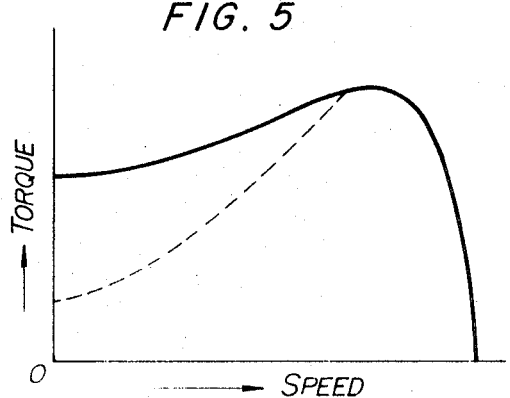
FIG. 5 is a torque versus speed characteristic curve of the motor.
Figure 3:
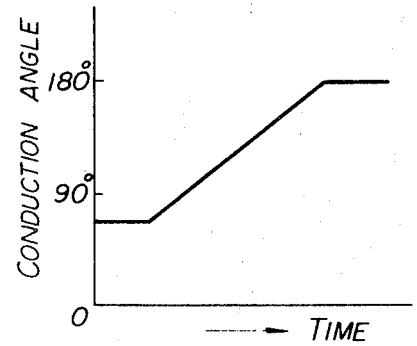
FIG. 3 is a characteristic curve relating to the conduction angles of silicon controlled rectifiers used in the device of FIG. 1.

Following the application of the line voltage to the motor M, the phase control circuit 1 gradually advances the firing angles of $SCR_1$ and $SCR_2$ as shown in FIG. 3 and causes a current to flow, as shown in FIG. 4, through the three-phase induction motor M. Thus, the torque versus speed characteristic of the motor M will be as shown by a dotted line in FIG. 5 and a soft starting may be allowed for the motor M. Further, the starting torque may be adjusted over a considerable range. The solid line in FIG. 5 represents the characteristic curve when the soft starting device according to the present invention is not employed. The detailed circuit diagram of the soft starting device according to the present invention is shown in FIG. 2.

Referring to FIG. 2, M designates a three-phase induction motor; U, V and W, motor terminals; R, S and T, three-phase source terminals; $SW_1$ a switch; $SCR_1$ and $SCR_2$, silicon controlled rectifiers; $SW_2$ a switch; Se a selenium arrester; $C_4$ a capacitor; $R_15$ a resistor; the switch $SW_2$ and the selenium arrester Se are both connected in parallel with $SCR_1$ and $SCR_2$, while a series branch formed by the capacitor $C_4$ and the resistor $R_15$ is also connected in parallel with $SCR_1$ and $SCR_2$. The switches $SW_1$ and $SW_2$ are so designed that when one is closed the other is opened.

Designated at VDR is a varistor connected between terminals $a$ and $b$; $D_1$, $D_2$, $D_3$ and $D_4$ are diodes forming a bridge-type rectifier circuit; ZD a zener diode; $R_4$, $R_5$, $R_6$, .........$R_12$ and $R_16$ are all resistors; $D_5$ a diode; $Tr_1$, $Tr_2$ and $Tr_3$, transistors; $C_1$, $C_2$ and $C_3$, capacitors; UJT a unijunction transistor; VR a variable resistor; PT a pulse transformer; $D_6$ and $D_7$, diodes which are connected respectively between the terminals of the two secondary coils of the pulse transformer PT through the resistors $R_13$ and $R_14$. The phase control circuit 1 is formed with the aforementioned circuit elements. One of the secondary coils of the transformer PT is connected between the cathode $K_1$ and the gate $G_1$ of $SCR_1$, while the other secondary coil is connected between the cathode $K_2$ and the gate $G_2$ of $SCR_2$. The varistor VDR functions to protect the circuits against surge voltages generated by the operation of the switches and the zener diode functions to provide a voltage of trapezoidal wave-shape.

Current control of the motor M is effected by the two silicon controlled rectifiers $SCR_1$ and $SCR_2$ connected in antiparallel with each other. That is, when starting the motor M, the conduction angles of $SCR_1$ and $SCR_2$ are held within small values so as to reduce the S-phase current and decrease the starting torque. Following this, the conduction angles of $SCR_1$ and $SCR_2$ are gradually enlarged to increase the torque of the motor M until finally the conduction angles of $SCR_1$ and $SCR_2$ reach nearly 180° so that the full line voltage is supplied to the motor M.

The control voltages for triggering $SCR_1$ and $SCR_2$ $SCR_1$ and $SCR_2$. However, if the impedance of the phase control circuit 1 and those of the resistors $R_1$ and $R_2$ are made equal to each other, the phase of the terminal $a$ and that of the terminal V tend to become almost equal so that the phase of the voltage between the terminal $b$ connected to the power supply terminal S of the S-phase through the switch $SW_1$ and said terminal $a$ also tends to become nearly equal to the phase of the anode-cathode voltages of $SCR_1$ and $SCR_2$, respectively.

Then, if the switch $SW_1$ is closed, the capacitor $C_1$ charges in accordance with the time constant of a series circuit consisting of the resistor $R_4$, diode 5, resistor $R_7$ and capacitor $C_1$, and its charging voltage is increased gradually. At this time, the base of the transistor $Tr_1$ is reverse biased and thus in off condition. As the voltage across the capacitor $C_1$ which is the base voltage of transistor $Tr_2$ increases gradually, the collector current of transistor $Tr_2$ increases. The capacitor $C_2$ is charged by the collector current and the voltage thereacross builds up gradually. The higher the voltage across the capacitor $C_2$, that is, as the base voltage of transistor $Tr_3$ goes up, the faster the capacitor $C_3$ is charged. As a result, the peak-point voltage of the unijunction transistor UJT is reached in less time. The discharged energy of the unijunction transistor UJT is applied to the gates $G_1$ and $G_2$ of $SCR_1$ and $SCR_2$, respectively, through the pulse transformer PT, with the result that the conduction angles of $SCR_1$ and $SCR_2$ increase gradually.

In other words, at the time immediately after the application of the source voltage to the power supply terminals R, S and T, the transistor $Tr_3$ is in off condition and the capacitor $C_3$ is not charged so that the silicon controlled rectifiers $SCR_1$ and $SCR_2$ will not conduct because of the conduction angles at zero degree. When, after that, the transistor $Tr_3$ transfers into conductive state and the charging speed of the capacitor $C_3$ increases gradually, the conduction angles of $SCR_1$ and $SCR_2$ also increase gradually until, at last, they reach close to 180° in electrical angles to thereby allow the application of full line voltage to the motor M. In this manner, soft starting of the motor M is effected.

It is to be noted that the series branch of the variable resistor VR and the resistor $R_11$ connected in parallel with the series circuit of the collector and emitter of the transistor $Tr_3$ and the resistor $R_10$ provides initial conduction angles of $SCR_1$ and $SCR_2$ to some extent. The reason is that if the S-phase voltage to be supplied to the motor M is zero at the start, no starting torque is given to the motor so that it cannot be started, therefore necessary conduction angles must be provided for the rectifiers to produce the required initial starting torque. This initial starting torque (the initial conduction angles) can be freely determined by adjusting the variable resistor VR.

On the other hand, the transistor $Tr_1$ functions to cause the capacitor $C_1$ to discharge its stored charge faster. That is, when voltage has been applied to the power supply terminals R, S and T, the transistor $Tr_1$ is not allowed to conduct as the base thereof is biased in the reverse direction; however, with the removal of voltage applied to the terminals R, S and T, the base current is caused to flow into the transistor $Tr_1$ by the charged voltage of capacitor $C_1$ through the resistors $R_7$ and $R_5$, with the result that the collector current flows through the transistor $Tr_1$ and the charge stored in the capacitor $C_1$ is discharged suddenly. Such being the case, the motor M never fails to start softly at its start even though the starting and stopping of the motor are repeated within a short period of time.

The functions of the selenium arrester Se and the series branch of the capacitor $C_4$ and the resistor $R_15$, both connected in parallel with the rectifiers $SCR_1$ and $SCR_2$, are to protect the rectifiers $SCR_1$ and $SCR_2$ against surge voltages produced when the main switch is operated.

Moreover, the switches $SW_1$ and $SW_2$ are arranged to short circuit the rectifiers $SCR_1$ and $SCR_2$ when the soft starting device goes wrong accidentally so that the motor is operated independently of the firing phase control circuit 1.

From the foregoing description of the embodiment of the present invention, it is evident that the soft motor starter according to the present invention is capable of starting a three-phase induction motor in an extremely soft manner because the conduction angles of silicon controlled rectifiers connected in series in one phase of a power supply circuit of the three-phase induction motor are controlled to gradually increase the starting torque of the motor continuously. Thus, if a motor provided with such a soft starting device is employed in applications, for example, running a hoist, a highly safe operation may be ensured, because a load suspended by the hoist will not be made to swing heavily by starting shocks which would be brought about without this starting device. Moreover, a rugged and inexpensive device can be obtained, because static devices are employed for the circuitry to control the conduction angles of the silicon controlled rectifiers.

I claim:

1. A soft starting device for motor comprising a three-phase induction motor with a squirrel-cage rotor, at least two silicon controlled rectifiers connected in antiparallel with each other and in series between the primary winding of said motor and one phase of a three-phase power source, impedance elements respectively connected at one end each thereof with the other two phases of said three-phase power source, and phase control circuit means providing small conduction angles for said rectifiers upon application of a source voltage to said motor, said phase control circuit means including means to automatically increase said conduction angles continuously, said phase control circuit means being connected between the power source sides of said rectifiers and the other ends of said impedance elements, and impedances of said impedance elements and said phase control circuit connected in star with respect to said three-phase power source being balanced.

2. A soft starting device for motors comprising a three-phase induction motor with a squirrel-cage rotor, two silicon controlled rectifiers connected in antiparallel with each other and in series between the primary winding of said motor and one phase of a three-phase power source, impedance elements respectively connected at one end each thereof with the other two phases of said three-phase power source, and a phase control circuit adapted to provide small conduction angles for said rectifiers upon application of the source voltage to said motor and then to automatically increase said conduction angles continuously, said phase control circuit being connected between the power source sides of said rectifiers and the other ends of said impedance elements, impedances of said impedance elements and said phase control circuit connected in star with respect to said three-phase power source being balanced, said phase control circuit further including a rectifier circuit having input terminals to which are applied a voltage of the same phase as the voltage applied to said silicon controlled rectifiers, resistors connected in series between output terminals of said rectifier circuit, a transistor having its base connected to the junction point of said resistors and its collector to the negative output terminal of said rectifier circuit, a diode connected between the emitter and base of said transistor, and a further resistor interposed between said junction point of said resistors and the emitter of said transistor.

3. A soft starting device for motor comprising a three-phase induction motor with a squirrel-cage rotor, two silicon controlled rectifiers connected in antiparallel with each other and in series between the primary winding of said motor and one phase of a three-phase power source, impedance elements respectively connected at one end each thereof with the other two phases of said three-phase power source, and a phase control circuit adapted to provide small conduction angles for said rectifiers upon application of the source voltage to said motor and then to automatically increase said conduction angles continuously, said phase control circuit being connected between the power source sides of said rectifiers and the other ends of said impedance elements, impedances of said impedance elements and said phase control circuit connected in star with respect to said three-phase power source being balanced, said phase control circuit further including a rectifier circuit having input terminals to which are applied a voltage of the same phase as the voltage applied to said silicon controlled rectifiers, first and second resistors connected in series between output terminals of said rectifier circuit, a transistor having the base thereof connected to the junction point of said first and second resistors through a third resistor, a fourth resistor connected between the emitter of said transistor and the negative output terminal of said rectifier circuit, a first capacitor connected between said negative output terminal and the base of said transistor, and a fifth resistor and a second capacitor connected between the collector of said transistor and the positive terminal of said rectifier circuit.

4. A soft starting device for motors comprising a three-phase induction motor with a squirrel-cage rotor, two silicon controlled rectifiers having anodes and cathodes thereof connected in antiparallel and connected in series between the primary winding of said motor and one phase of a three-phase power source, first and second impedance elements respectively connected at one end each thereof with the other two phases of said three-phase power source, and a phase control circuit adapted to provide small conduction angles for said rectifiers upon application of the source voltage to said motor and then to automatically increase said conduction angles continuously, said phase control circuit being connected between the power source sides of said rectifiers and the other terminals of said first and second impedance elements, impedances of said first and second impedance elements and said phase control circuit connected in star with respect to said three-phase power source being balanced, said phase control circuit further including a rectifier circuit having input terminals to which are applied a voltage of the same phase as the voltage applied to said rectifiers, a varistor connected between said input terminals, third and fourth resistors connected in series between output terminals of said rectifier circuit, a first transistor having its base connected to the junction point of said third and fourth resistors and its collector to the negative output terminal of said rectifier circuit, a diode connected between the emitter and base of said first transistor, a fifth resistor interposed between the junction point of said third and fourth resistors and the emitter of said first transistor, a second transistor having the base thereof connected to said junction point of said third and fourth resistors through said fifth resistor, a sixth resistor connected between the emitter of said second transistor and the negative output terminal of said rectifier circuit, a first capacitor connected between said negative output terminal and the base of said second transistor, a seventh resistor and a second capacitor connected between the collector of said second transistor and the positive output terminal of said rectifier circuit, an eighth resistor connected between the emitter and collector of said second transistor, a third transistor having the base thereof connected to the collector of said second transistor, a third capacitor connected between the collector of said third transistor and said negative output terminal, a ninth resistor connected between the emitter of said third transistor and said positive output terminal, a variable resistor interposed between the collector of said third transistor and said positive output terminal, a unijunction transistor having the emitter thereof connected to the collector of said third transistor, and a pulse transformer having two secondary coils each connected between the cathode and gate of each of said two silicon controlled rectifiers and a primary coil connected to the base circuit of said unijunction transistor.